No. 765,077. PATENTED JULY 12, 1904.
C. HUNDT.
SELF CLOSING STOP VALVE.
APPLICATION FILED MAR. 6, 1903.
NO MODEL.

Witnesses.

Inventor.
Carl Hundt
Attorney

No. 765,077. Patented July 12, 1904.

UNITED STATES PATENT OFFICE.

CARL HUNDT, OF VIENNA, AUSTRIA-HUNGARY.

SELF-CLOSING STOP-VALVE.

SPECIFICATION forming part of Letters Patent No. 765,077, dated July 12, 1904.

Application filed March 6, 1903. Serial No. 146,569. (No model.)

*To all whom it may concern:*

Be it known that I, CARL HUNDT, a citizen of the Empire of Austria-Hungary, residing at Vienna, Austria-Hungary, have invented certain new and useful Improvements in Self-Closing Stop-Valves; and I do hereby declare the following to be a full, clear, and exact description of the invention, such as will enable others skilled in the art to which it appertains to make and use the same.

This invention relates to improvements in self-closing stop-valves; and it consists in preventing rushes of steam unduly closing the same by forming between the guide-stud and the crown of the valve a closed space connected by a channel in the said guide-stud with a pipe reaching into the steam-space, at the orifice of which an aspiration is created, which through the said pipe and channel reduces the pressure in the said space and causes the valve to be pressed down. In order to be able to regulate the amount of the said aspiration at will, the section of the said pipe may be varied by means of a spindle-valve.

In order that my invention may be more fully understood, I have caused to be appended hereunto one sheet of drawings, marked with letters of reference indicating like parts in both figures and showing two forms in which the same may be carried out.

Figure 1:
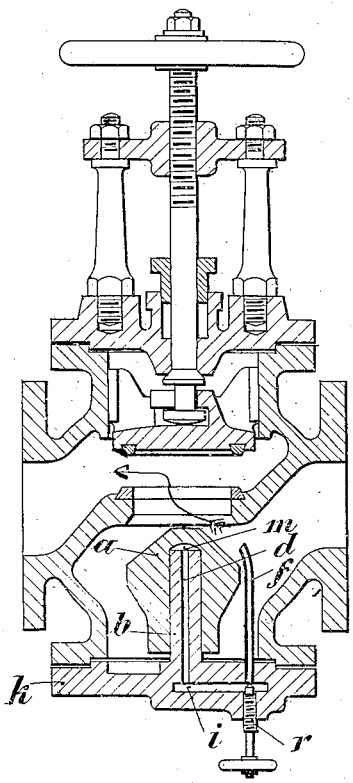
Figure 2:
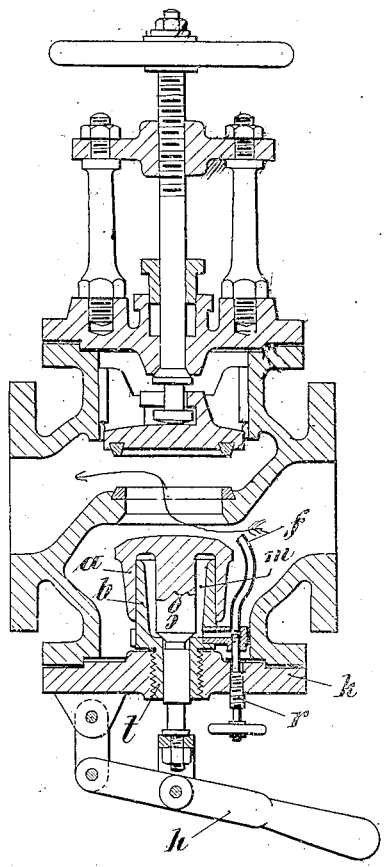

In the drawings, Figure 1 is a sectional view of a valve constructed in accordance with my invention and intended for use especially with stationary engines, and Fig. 2 is a similar view of a slightly-modified form of valve intended for use with non-stationary and especially marine engines.

In carrying out my invention and referring to Fig. 1, I mount and guide the valve $a$, which is closed at the crown, upon a stud $b$ in such a manner that between its upper end and the inner end of the valve-bore a closed space $m$ is provided in the valve communicating with a channel $d$, formed longitudinally in the stud $b$. By means of the port $i$ the channel $d$ is connected with the pipe $f$, reaching into the steam-space, and in order to produce a vigorous aspiration at its orifice the respective part is bent parallel to or in the direction in which the steam passes. In order to permit of varying the decrease of pressure in the space $m$ while the valve is at work, a spindle-valve $r$ is employed, whereby the section of the inlet of the pipe $f$ can be varied at will. There will thus always be a reduced pressure in the space $m$ between the upper end of the stud $b$ and the inner end of the bore in the valve $a$, communicating with the steam-space proper through the pipe $f$, which under normal conditions of working prevents the undue closing of the valve, while the aspiration which checks the self-closing of the valve can be regulated by throttling the inlet of the pipe $f$ by means of valve $r$, as may be required to suit various pressures of steam. Under ordinary circumstances the proper action of the valve $a$ will be maintained; but when an extra rush of steam occurs the steam passing from right to left creates an aspiration which is produced at the orifice of pipe $f$, which is bent in the direction of the passage of the steam, which aspiration will tend to create a vacuum in the space $m$ and will firmly hold the valve $a$ down until the extra rush of steam subsides, thus holding the valve down and preventing it from closing during such rush. It will be understood that the steam-pressure is maintained at all times in space $m$ through the pipe $f$, pipe $i$, and channel $d$ by reason of the fact that these pipes and channel establish an open connection between said space $m$ and the steam passing through the valve.

For non-stationary engines, particularly marine engines, which are subject to much intense vibration, the form of valve shown in Fig. 2 is preferable, as therein the undue closing of the valve through vibration is still further guarded against, the valve-body $a$ being guided more securely, the surface upon which the reduced pressure acts being considerably larger, and the differential pressure upon the valve being caused to act downward. In this construction of valve the stud $b$ takes the form of a tube the narrow part $t$ of which is screwed into the valve-cover $k$ and the part $b$ of which guides the valve-body $a$. The latter has also a spindle $g$ reaching through the part $t$ and is thus guided in the latter. To facilitate the return of the valve $a$ into its normal position after having worked, its spindle $g$, passing through the part $t$, has at its free end attached a lever $h$. In this form of valve the pressure is reduced by the same means as is the case in the valve shown in Fig. 1. However, as in the valve shown in Fig. 2 the surface acted upon by the steam-pressure which forces the valve downward is larger than the surface exposed to the up pressure, the valve is forced downward by the aspiration from pipe $f$ and also by the differential steam-pressure, which corresponds with the steam-pressure upon the sectional surface of the spindle $g$.

The secure manner in which the valve is guided and the considerable force with which it is held upon its seat prevents same being affected in any way by external vibrations and rushes of steam, which, as is well known, cause the valve to close unduly.

Having thus fully described my invention, what I claim as new, and desire to secure by Letters Patent of the United States, is—

1. A self-closing stop-valve, comprising a guide-stud having a channel therethrough, a valve-head bored and mounted upon said stud leaving a space between the stud and the inner end of the bore, a pipe leading from the steam-space through the stud into the bore of the valve-head, and means for regulating the capacity of the pipe, substantially as described.

2. A self-closing stop-valve, comprising a guide-stud in the form of a tube, a valve-head bored and mounted upon said tubular stud and provided with a spindle entering said tubular stud, a pipe leading from the steam-space into the space between the guide-stud and the inner end of the bore of the valve-head, and means for regulating the capacity of the pipe, substantially as described.

3. A self-closing stop-valve comprising a guide-stud having a channel therethrough, a valve-head bored and mounted on said stud, and a pipe leading from said channel to the steam-space and having an open end bent in the direction of the passage of the steam through the steam-space, substantially as described.

4. A self-closing stop-valve, comprising a guide-stud in the form of a tube, a valve-head bored and mounted upon said tubular stud and provided with a spindle entering said tubular stud, a pipe leading from the steam-space into the space between the guide-stud and the inner end of the bore of the valve-head, and having its open end in the steam-space bent in the direction of the passage of the steam therethrough, substantially as described.

In testimony whereof I affix my signature.

CARL HUNDT.

In presence of—
ALVESTO S. HOGUE,
AUGUST FUGGER.